United States Patent
Bernstein et al.

(10) Patent No.: US 10,062,118 B1
(45) Date of Patent: Aug. 28, 2018

(54) CONCEPTS FOR PROVIDING AN INSURANCE QUOTE

(71) Applicant: LIBERTY MUTUAL INSURANCE COMPANY, Boston, MA (US)

(72) Inventors: Daniel Carey Bernstein, Boston, MA (US); Christopher Ralph Tassone, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 166 days.

(21) Appl. No.: 14/242,959

(22) Filed: Apr. 2, 2014

(51) Int. Cl.
    *G06Q 30/02* (2012.01)
    *G09G 5/377* (2006.01)
    *G06Q 40/08* (2012.01)

(52) U.S. Cl.
    CPC .................... *G06Q 40/08* (2013.01)

(58) Field of Classification Search
    CPC ......... G06Q 40/08; G06Q 30/02; G09G 5/377
    See application file for complete search history.

(56) References Cited

U.S. PATENT DOCUMENTS

| | | | |
|---|---|---|---|
| 6,677,858 B1 * | 1/2004 | Faris | G06Q 30/06 340/573.1 |
| 7,941,330 B1 | 5/2011 | Buentello et al. | |
| 8,170,840 B2 | 5/2012 | Pershing | |
| 8,229,769 B1 * | 7/2012 | Hopkins, III | G06Q 10/0635 382/100 |
| 8,275,640 B2 | 9/2012 | Jayaram et al. | |
| 8,346,578 B1 | 1/2013 | Hopkins, III et al. | |
| 8,401,878 B2 | 3/2013 | Stender et al. | |
| 8,620,693 B1 | 12/2013 | Schumann, Jr. | |
| 2005/0289166 A1 * | 12/2005 | Stanley | G06F 17/30286 |
| 2009/0132316 A1 * | 5/2009 | Florance | G06Q 30/06 701/532 |
| 2010/0174564 A1 * | 7/2010 | Stender | G06Q 10/10 705/4 |

(Continued)

OTHER PUBLICATIONS

Winter, N. L. (1997). Managing a mega-disaster: GIS applications, decision making and spatial data flow between local, state and federal levels in hurricane andrew disaster management (Order No. 9726503). Available from ProQuest Dissertations & Theses Global. (304376848).*

(Continued)

*Primary Examiner* — Muriel S Tinkler
(74) *Attorney, Agent, or Firm* — Alston & Bird LLP

(57) ABSTRACT

Computer program products, methods, systems, apparatus, and computing entities for providing a quote for an insurance policy are provided. In one embodiment, a method is provided comprising (a) receiving image data of a property to be insured; (b) after receiving the image data of the property to be insured, requesting external information from one or more external information sources, the external data associated with the property to be insured and comprising at least one selected from the group consisting of historical data of the property to be insured and area data of the property to be insured; (c) providing at least a portion of the external data associated with the property to be insured; and (d) providing a quote for an insurance policy for the property to be insured based at least in part on the external data.

20 Claims, 9 Drawing Sheets

(56) References Cited

U.S. PATENT DOCUMENTS

| | | | | |
|---|---|---|---|---|
| 2012/0246013 | A1* | 9/2012 | Hickman | G06Q 30/02 705/14.71 |
| 2013/0085782 | A1 | 4/2013 | Raviv et al. | |
| 2013/0144656 | A1 | 6/2013 | Peak et al. | |
| 2013/0166325 | A1 | 6/2013 | Ganapathy et al. | |
| 2013/0201340 | A1 | 8/2013 | Meadow et al. | |
| 2013/0204645 | A1* | 8/2013 | Lehman | G06Q 40/08 705/4 |
| 2013/0211790 | A1 | 8/2013 | Loveland et al. | |
| 2013/0211916 | A1 | 8/2013 | Putman | |
| 2013/0262029 | A1* | 10/2013 | Pershing | G06Q 10/06 702/156 |
| 2013/0290036 | A1* | 10/2013 | Strange | G06Q 40/08 705/4 |
| 2013/0297352 | A1 | 11/2013 | Noe et al. | |
| 2013/0317860 | A1 | 11/2013 | Schumann, Jr. | |
| 2013/0317861 | A1 | 11/2013 | Tofte et al. | |
| 2013/0329943 | A1 | 12/2013 | Christopulos et al. | |
| 2014/0039937 | A1 | 2/2014 | Murphy | |
| 2015/0025914 | A1* | 1/2015 | Lekas | G06Q 40/08 705/4 |
| 2015/0169255 | A1* | 6/2015 | Arakawa | G06F 3/121 358/1.14 |
| 2016/0092959 | A1* | 3/2016 | Gross | G06K 9/00671 705/26.62 |

OTHER PUBLICATIONS

Williams, W. (1960). Determining the Actual Cash Value of Commercial Real Property for Insurance Purposes (Order No. 6002855). Available from ProQuest Dissertations & Theses Global. (301873066). Retrieved from https://search.proquest.com/docview/301873066?accountid=14753.*

Halloran, M. (1995). Environmental site assessments. Practial Lawyer, 41(5)61. Retrieved from https://search.proquest.com/docview/274358713?accountid=14753.*

Tsetsenekos, Alex, "3 Ways to Tailor the Insurace Experience to Millennial Homeowners", Property Casualty 360, Mar. 25, 2014, retrieved from <http://www.propertycasualty360.com/2014/03/25/3-ways-to-tailor-the-insurance-experience-to-mille?eNL=5331d40a160ba0c43fe383f5&utm_source=PC360DailyeNews&utm_medium=eNL&utm_campaign=PC360_eNLs&_LID=86145540&t=personal> on Apr. 22, 2014, 2 pages.

Estrella, B.S., et al., "Utilizing Smartphone Resources with Homesite Insurance", Worcester Polytechnic Institute, Apr. 25, 2013, retrieved from <http://www.wpi.edu/Pubs/E-project/Available/E-project-042413-201816/unrestricted/HomesiteInsurance2013FinalReport.pdf> on Apr. 22, 2014, 106 pages.

Wurdeman, Matthew T., "Term Paper: Mobile Computing and Social Networks", Sep. 9, 2012, 15 pages, retrieved from <http://elementsofcoldfusion.net/wp-content/uploads/2011/10/Term-Paper-Mobile-Computing-and-Social-Networks.pdf> on Apr. 22, 2014.

Unknown Author, "Progressive Named to InformationWeek 500 for 12th Year in a Row; Mobile Quoting Platform Earns Accolades for Car Insurance Group", Sep. 14, 2011, 4 pages, retrieved from <http://www.progressive.com/newsroom/article/2011/september/info-week-500> on Apr. 22, 2014.

Unknown Author, "Nationwide(R) Mobile Application Now Available on Apple App Store" Business Wire, Apr. 22, 2009, 2 pages, retrieved from <http://www.thefreelibrary.com/Nationwide%5BR%5D+Mobile+Application+Now+Available+on+Apple+App+Store.-a0198283125> on Apr. 23, 2014.

Unknown Author, "GEICO.com Launches iPhone-ready Rate Quote Mobile Web Application", Business Wire, Jun. 9, 2010, 1 page, retrieved from <http://www.thefreelibrary.com/GEICO.com+Launches+iPhone-ready+Rate+Quote+Mobile+Web+Application.-a0228443091> on Apr. 23, 2014.

Unknown Author, "First Ever iPhone Application for Insurance Quotes Unveiled", Business Wire, Jan. 26, 2009, 1 page, retrieved from <http:www.thefreelibrary.com/First+Ever+iPhone+Application+for+Insurance+Quotes+Unveiled.-a0192581084> on Apr. 23, 2014.

* cited by examiner

CONCEPTS FOR PROVIDING AN INSURANCE QUOTE

BACKGROUND

At present, if a property owner or a perspective property owner (herein referred to as a property owner, prospective property owner, and/or similar words used herein interchangeably) wishes to request a quote for property insurance (e.g., homeowner's insurance, condominium insurance, commercial building insurance, renter's insurance, flood insurance, and/or the like), the property owner may either call an insurance agent or access an insurance provider's website. In doing so, the property owner may spend twenty minutes or more answering questions about the property and himself or herself. This method of requesting and providing insurance quotes is inefficient and may be frustrating to property owners. For example, if a property owner is considering purchasing one of multiple properties, the property owner may request insurance quotes for each property and/or from multiple insurance agencies. In such a case, for each property and each insurance agency, the property owner may need to spend a significant amount of time answering and re-answering questions, which may lead to frustration and wasted time. Additionally, the answer to many of the questions asked in an insurance application may be unknown to the property owner (e.g., distance to the nearest fire department and/or the like), which may lead to further frustration. Therefore, a need exists in the art for improved methods, systems, apparatuses, and computer program products for providing insurance quotes.

BRIEF SUMMARY

In general, embodiments of the present invention provide methods, apparatus, systems, computing devices, computing entities, and/or the like for the improved and efficient provision of an insurance quote.

In accordance with on aspect, a method for providing a quote for an insurance policy is provided. In one embodiment, the method comprises receiving, via one or more processors, image data of a property to be insured; and, after receiving the image data of the property to be insured, requesting, via the one or more processors, external information from one or more external information sources. The external information is associated with the property to be insured and comprises at least one selected from the group consisting of historical data of the property to be insured and area data of the property to be insured. The method may further comprise providing, via the one or more processors, at least a portion of the external information associated with the property to be insured; and providing, via the one or more processors, a quote for an insurance policy for the property to be insured based at least in part on the external information.

In accordance with another aspect, a system for providing a quote for an insurance policy is provided. In one embodiment, the system comprises one or more memory storage areas and one or more processors. The system may be configured to receive, via the one or more processors, image data of a property to be insured; and after receiving the image data of the property to be insured, request, via the one or more processors, external information from one or more external information sources. The external information is associated with the property to be insured and comprises at least one selected from the group consisting of historical data of the property to be insured and area data of the property to be insured. The system may be further configured to provide, via the one or more processors, at least a portion of the external information associated with the property to be insured; and provide, via the one or more processors, a quote for an insurance policy for the property to be insured based at least in part on the external information.

In accordance with yet another aspect, a computer program product for providing a quote for an insurance policy is provided. The computer program product may comprise at least one non-transitory computer-readable storage medium having computer-readable program code portions stored therein. In one embodiment, the computer-readable program code portions comprise an executable portion configured to receive image data of a property to be insured; and an executable portion configured to, after receiving the image data of the property to be insured, request external information from one or more external information sources. The external information is associated with the property to be insured and comprises at least one selected from the group consisting of historical data of the property to be insured and area data of the property to be insured. The computer-readable program code portions may further comprise an executable portion configured to provide at least a portion of the external information associated with the property to be insured; and an executable portion configured to provide a quote for an insurance policy for the property to be insured based at least in part on the external information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
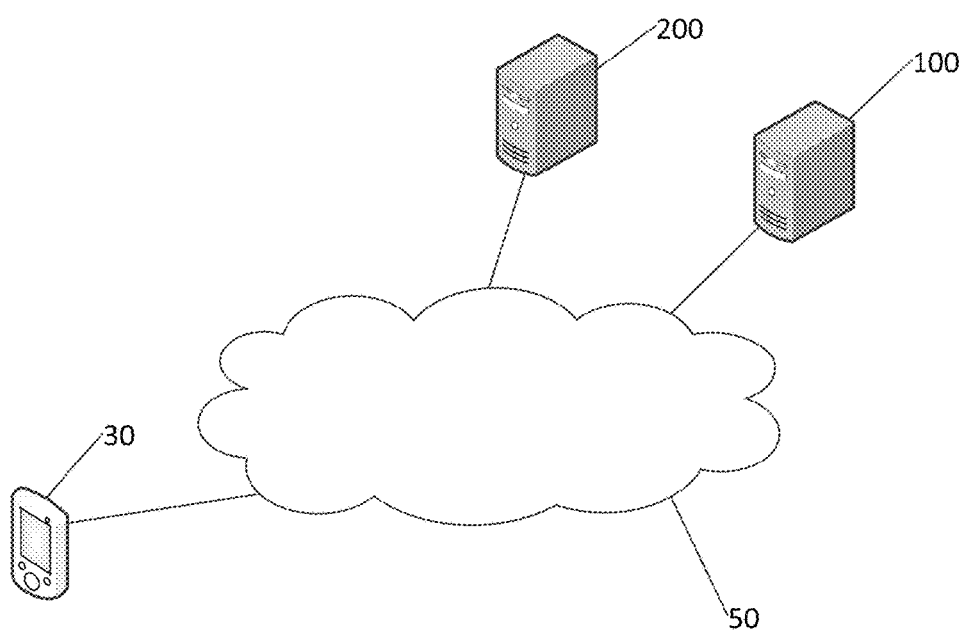
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative"

and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention are directed to various concepts for providing insurance quotes. In various embodiments, a user may initiate the quote request process by capturing image data associated with a property to be insured. For example, the user may capture image data of a house using his or her smartphone. Information/data regarding the location of the property may be determined, for example, based on location information/data associated with the image data associated with the property to be insured (e.g., a global positioning system (GPS) tag and/or the like). In various embodiments, information/data regarding the property to be insured (e.g., year built, number of bedrooms, number of bathrooms, square footage, and/or the like) may be determined based on information/data gathered from various databases (e.g., Trulia, Zillow, database(s) storing information related to previous claims and/or losses associated with the property, Multiple Listing Service (MLS), municipal/county records, and/or the like). In various embodiments, an insurance quote is determined and provided. Information/data related to the property, neighborhood associated with the property, and/or area associated with the property may also be provided. For example, information/data regarding crime statistics in the neighborhood where the property is located, history of water-related damage in the area where the property is located, demographic information/data for the county where the property is located, previous claims for losses at the property, and/or the like) may be provided. A further example, information/data regarding driving directions to where the property is located based on the safest travel route leveraging prior claims loss information may be provided.

III. Exemplary System Architecture

FIG. 1 provides an illustration of an exemplary embodiment of the present invention. As shown in FIG. 1, this particular embodiment may include one or more quote systems 100, one or more networks 50, one or more user computing entities 30, and one or more external information/data source systems 200. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Quote Systems 100

Figure 2:
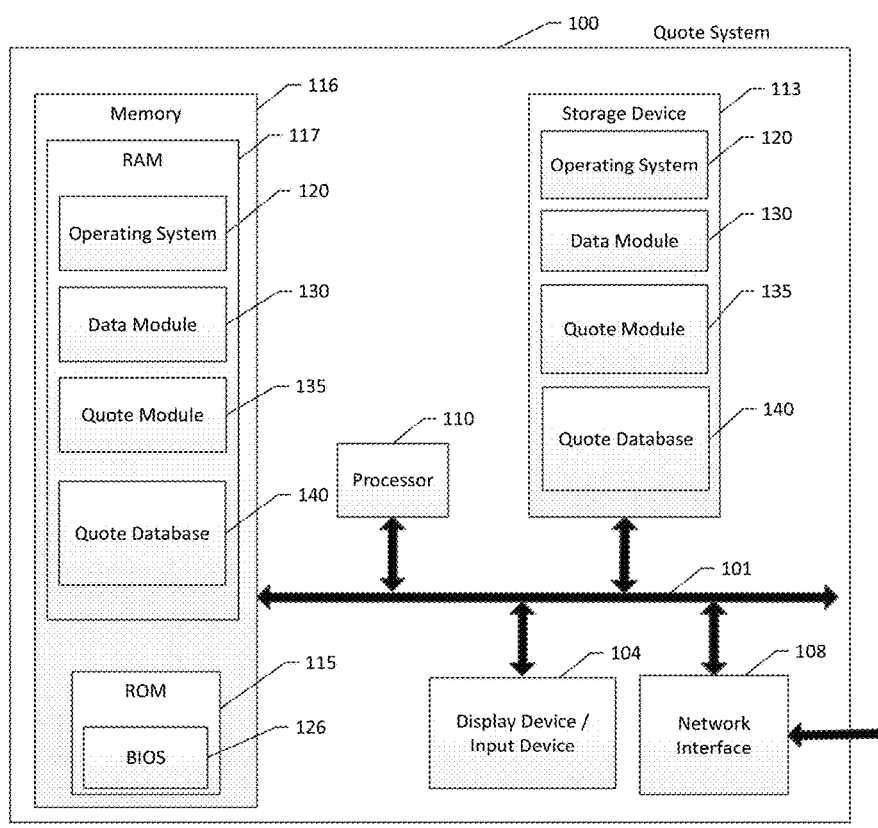
FIG. 2 is an exemplary schematic diagram of a quote system according to one embodiment of the present invention.

A quote system 100 may be operated by and/or on behalf of an insurance provider or other individual or organization that may provide an insurance quote. In various embodiments, multiple quote systems 100 may be used for the provision of insurance quotes. FIG. 2 shows a schematic diagram of an example quote system 100. In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the quote system 100 may also include one or more communications interfaces for communicating with various computing entities, such as by communicating data, content, information, and/or similar terms used herein interchangeably that can be transmitted, received, operated on, processed, displayed, stored, and/or the like. For instance, the quote system 100 may communicate with one or more user computing entities 30 and/or one or more external information/data source systems 200.

In one embodiment, the quote system 100 may include or be in communication with one or more processing elements 110 (also referred to as processors, processing circuitry, and/or similar terms used herein interchangeably) that communicate with other elements within the quote system 100 via a bus 101, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

In one embodiment, the quote system 100 may further include memory or be in communication with memory 116, which may comprise non-volatile media (also referred to as non-volatile storage, memory, memory storage, memory circuitry and/or similar terms used herein interchangeably). In one embodiment, the non-volatile storage or memory 116 may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. For example, the non-volatile storage or memory may store code including data module 130 and/or quote module 135. The term database, database instance, database management system, and/or similar terms used herein interchangeably may refer to a structured collection of records or data that is stored in a computer-readable storage medium, such as via a relational database, hierarchical database, and/or network database. For example, the non-volatile storage or memory may comprise a quote database 140.

In one embodiment, the memory 116 may further comprise volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the quote system 100 with the assistance of the processing element 110 and operating system 120.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 110 using an I/O bus instead of a dedicated bus. The memory 116 could also be secondary memory, such as disk storage, that stores a relatively large amount of data. The secondary memory may be a floppy disk, hard disk, compact disk, DVD, or any other type of mass storage type known to those skilled in the computer arts. The memory 116 may also comprise any application program interface, system, libraries and any other data by the processor to carry out its functions. ROM 115 is used to store a basic input/output system 126 (BIOS), containing the basic routines that help to transfer information/data between components of the quote system 100, including the data module 130, the quote module 135, the quote database 140, and/or the operating system 120.

In addition, the quote system 100 includes at least one storage device 113, such as a hard disk drive, a floppy disk drive, a CD-ROM drive, or optical disk drive, for storing information/data on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120, the data module 130, and/or the quote module 135. Those skilled in the art will appreciate that other modules may be present in RAM 117 to effectuate the various embodiments of the present invention. Furthermore, the functions of the data module 130 and/or the quote module 135 need not be modular.

Also located within the quote system 100 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the quote system 100 may be in communication with one or more user computing entities 30. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the quote system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information/data can be received by the quote system 100 via the network interface 108 and/or input/output device 104. This information/data may include information/data related to a property to be insured, information/data related to a user who would like to insure a property, underwriting business rules, and/or the like. This input information/data may vary, however, depending on the configuration and informational requirements of the quote system 100.

As mentioned above, the quote system 100 also includes an input/output device 104 for receiving and displaying data. The quote system 100 may include or be in communication with one or more input elements, such as a keyboard input, a mouse input, a touch screen/display input, audio input, pointing device input, joystick input, keypad input, and/or the like, as indicated by input/output device 104. The quote system 100 may also include or be in communication with one or more output elements, as indicated by input/output device 104, such as audio output, video output, screen/display output, motion output, movement output, and/or the like.

In various embodiments, the quote system 100 may be configured to generate and/or provide insurance quotes. The quote system 100 may be further configured to access information/data related to a property to be determined, possibly via one or more external information/data source systems 200. Additionally, the quote system 100 may be configured to provide the insurance quote to the user computing entity 30. The quote system 100 may be configured to be in communication with one or more external information/data source systems 200 and/or one or more user computing entities 30.

The quote system 100 may also comprise, be associated with, or be in communication with various other internal systems, such as a claims system for receiving and administering insurance claims, an underwriting system, and a variety of other systems and their corresponding components.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the quote system 100 may be located remotely from other quote system 100 components, such as in a distributed system. Furthermore, one or more of the components may be combined and additional components performing functions described herein may be included or associated with the quote system 100. Thus, the quote system 100 can be adapted to accommodate a variety of needs and circumstances.

2. Exemplary User Computing Entities 30

Figure 3:
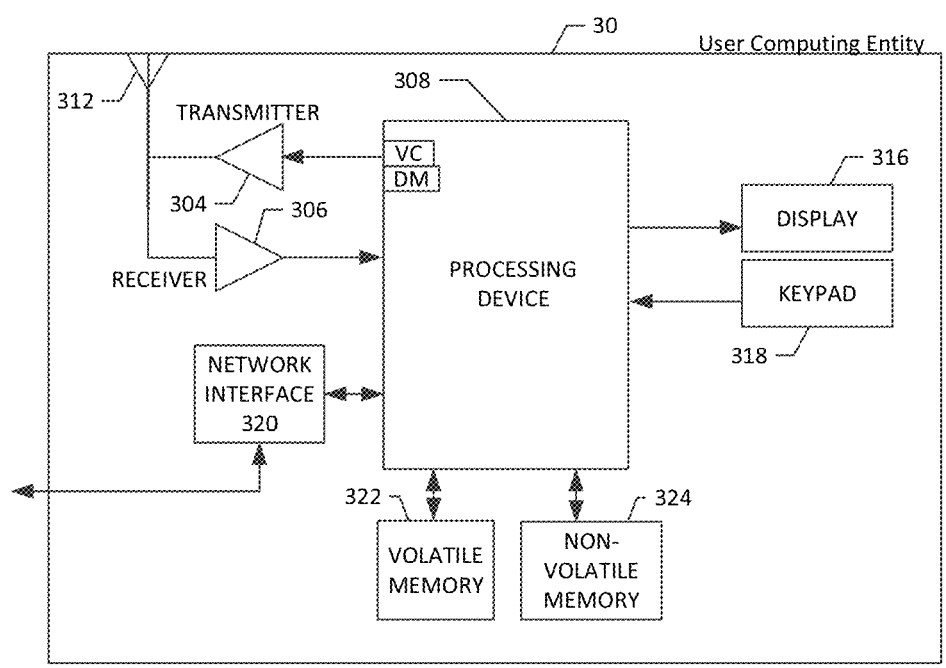
FIG. 3 is an exemplary schematic diagram of a user computing entity according to one embodiment of the present invention.

A user may be an individual, a family, a company, an organization, an entity, a department within an organization, a representative of an organization and/or person, and/or the like. For example, in one context, a user may be a property owner (e.g., a property owner or a perspective property owner) or an insurance representative (e.g., an employee or a representative of an insurance provider). A user computing entity 30 may be any computing entity operated by and/or on behalf of a user. To do so, a user or user's agent may operate a user computing entity 30 that includes one or more components that are functionally similar to those of the quote system 100. FIG. 3 provides an illustrative schematic representative of a user computing entity 30 that can be used in conjunction with embodiments of the present invention. In general, the terms device, system, computing entity, entity, and/or similar words used herein interchangeably may refer to, for example, one or more computers, computing entities, desktops, mobile phones, smartphones, tablets, phablets, notebooks, laptops, distributed systems, gaming consoles (e.g., Xbox, Play Station, Wii), portable game consoles (e.g., Game Boy, Nintendo DS), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

As shown in FIG. 3, the user computing entity 30 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the quote system 100. In a particular embodiment, the user computing entity 30 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, WiMAX, UWB, IR, NFC, Bluetooth, USB, and/or the like. Similarly, the user computing entity 30 may operate in accordance with multiple wired communication standards and protocols, such as those described above with regard to the quote system 100 via a network interface 320.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspects, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, global positioning systems (GPS), and/or the like. Alternatively, the location information/data can be determined by triangulating the user computing entity's 30 position in connection with a variety of other systems, including cellular towers, Wi-Fi access points, accelerometers, gyroscopes, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 30 may also comprise a user interface (that can include a display 316 coupled to a processing element 308) and/or a user input interface (coupled to a processing element 308). For example, the user interface may be a mobile application, a user application, browser, user interface, and/or similar words used herein interchangeably executing on and/or accessible via the user computing entity 30 to interact with and/or cause display of information/data from the quote system 100, as described herein. The user input interface can comprise any of a number of devices allowing the user computing entity 30 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the quote system 100 and/or various other computing entities.

According to various embodiments, the user computing entity 30 may also include one or more components for capturing image data, such as one or more imaging devices (not shown). An imaging device may include one or more video cameras, camcorders, still cameras, Internet-Protocol (IP) cameras, Single-Lens Reflex (SLR) cameras, high-speed cameras, and/or the like. Such imaging devices may include one or more wide angle lenses and/or one or more narrow angle lenses, one or more close-up lenses, and/or the like. In one embodiment, the imaging devices of the user computing entity 30 may also be connected to (or include) one or more network interfaces (e.g., wired or wireless) for communicating with various computing entities. This communication may be via the same or different wired or wireless networks using a variety of wired or wireless transmission protocols. This may allow the imaging devices to transmit/send images (e.g., image data) they capture. The imaging data captured by the imaging devices may include image data associated with a property to be insured and/or the like. The resolution of the images (e.g., image data) captured by the imaging device may be, for instance, 640 pixels by 480 pixels or a variety of other resolutions.

In one embodiment, the image data can be captured for analysis. To do so, the image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest (e.g., pools, windows, siding, roofs, doors, hazards, vehicles, boundaries, trees, shrubbery, and/or the like), locations, addresses, and/or the like) can be extracted from the image data.

In another embodiment, the user computing entity 30 may include one or more components or functionality that are the same or similar to those of the quote system 100, as described in greater detail above. As will be recognized, these architectures and descriptions are provided for exemplary purposes only and are not limiting to the various embodiments.

3. Exemplary External Information/Data Source Systems 200

In one embodiment, various entities may operate external information/data source systems 200. For example, a system storing municipal or county property records, a system storing real estate listing information/data (e.g., a system storing information associated with Trulia, Zillow, Multiple Listing Service (MLS), Porch.com, Google, and/or the like), and a system storing previous claim information/data for one or more properties (e.g., database(s) storing information related to previous claims and/or losses associated with the property, Comprehensive Loss Underwriting Exchange (CLUE), and/or the like) may each be an information/data source system 200. An external information/data source system 200 may include one or more components that are functionally similar to those of the quote system 100 and/or the user computing entity 30. For example, in one embodiment, each external information/data source system 200 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the quote system 100 may communicate or interact with any number of external information/data source systems 200 via their respective communication interfaces information/data. This may also enable the external information/data source system 200 to communicate with various other computing entities, such as user computing entities 30, and/or various other computing entities. As will be recognized, these architectures and descriptions are provided for exemplary purposes only and are not limiting to the various embodiments.

III. Exemplary System Operation

Figure 4:
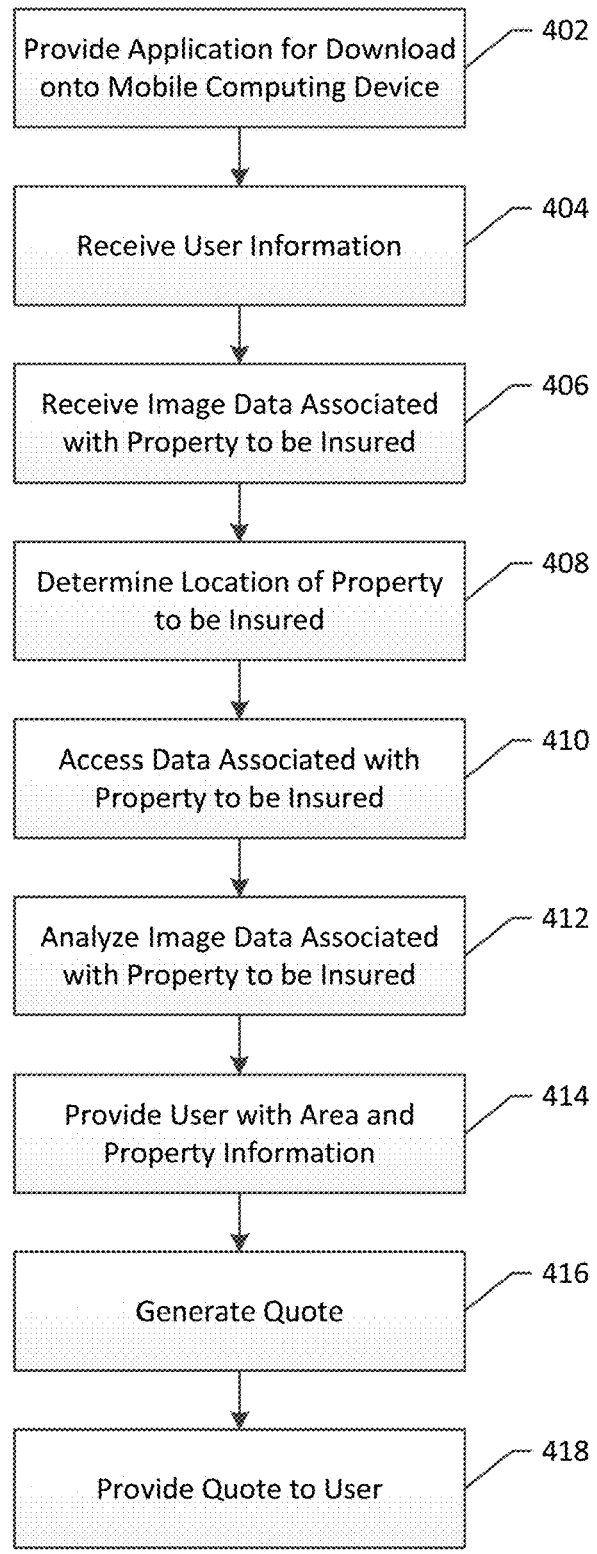
FIG. 4 is a flowchart illustrating operations and processes that can be used in accordance with various embodiments of the present invention.

Reference will now be made to FIGS. 4-8. FIG. 4 is a flowchart illustrating operations and processes that may be performed in relation to generating and providing insurance quotes, in accordance with various embodiments of the present invention. FIGS. 5-8 illustrate various views of an example interactive user interface (e.g., a user application, a browser, a user interface, and/or similar words used herein interchangeably), in accordance with an embodiment of the present invention.

In various embodiments, at step 402, a mobile application (e.g., a user application, a browser, a user interface, and/or the like), may be downloaded onto and/or accessed via a user computing entity 30. At step 404, user information/data may be received by the quote system 100 (e.g., via the user computing entity 30). For example, each time or the first time a user (e.g., property owner, prospective property owner, user, REALTOR®, agent, insurance provider representative, and/or similar words used herein interchangeably) accesses the user interface (e.g., the first time the user opens the mobile application on the user computing entity 30 or the first time a user logs on to the user interface via a web browser), the user may be prompted to provide various information/data associated with the user. For example, the user may be prompted to input (e.g., via a user computing entity 30) identifying information/data, contact information/data, other information/data, and/or the like. For example, identifying information/data may include one or more of a user's name, government identification number (e.g., driver's license number), social security number, birthdate, birth location, and/or the like. Contact information/data may include one or more of a mailing address, a home address, a work address, a home phone number, a cell phone number, a work phone number, an email address, a social network handle (e.g., a Facebook or Twitter username), and/or the like. The user may also be prompted to input other information/data (e.g., via the user computing entity 30) that can be used to calculate an insurance score based on one or more insurance score models. In various embodiments, this other information/data may include one or more of a user's employment status, length of time in current employment position, household income, age, relationship status, insurance claim history, payment history, credit history, debt history, and/or the like. In various embodiments, responsive to the prompting, the user can provide the requested information/data via the user computing entity 30. In some embodiments, the provided information/data is stored locally in memory associated with the user computing entity 30 and/or provided to the quote system 100.

To initiate a quote, in one embodiment, the user (e.g., property owner, prospective property owner, user, REALTOR®, agent, and/or insurance provider representative) may operate the user computing entity 30 to capture image data of property to be insured and transmit the image data to the quote system 100. For example, a user may use the mobile application (e.g., a user application, a browser, a user interface, and/or the like) to leverage the imaging device of the user computing entity 30 to capture image data associated with a property to be insured. In another example, a user (e.g., operating the user computing entity 30) may use a separate imaging device to capture image data associated with a property to be insured and transfer the image data to the user computing entity 30 (e.g., via bumping, short-range connections, and/or any of the wired or wireless connections previously described). The image data may comprise one or more images of the property to be insured. For example, the image data may include an image of the front of the property, each side of the property, the back of the property, and/or an aerial view of the property. As will be recognized, the image data may comprise any number of images of the property to adapt to various needs and circumstances.

Figure 5:
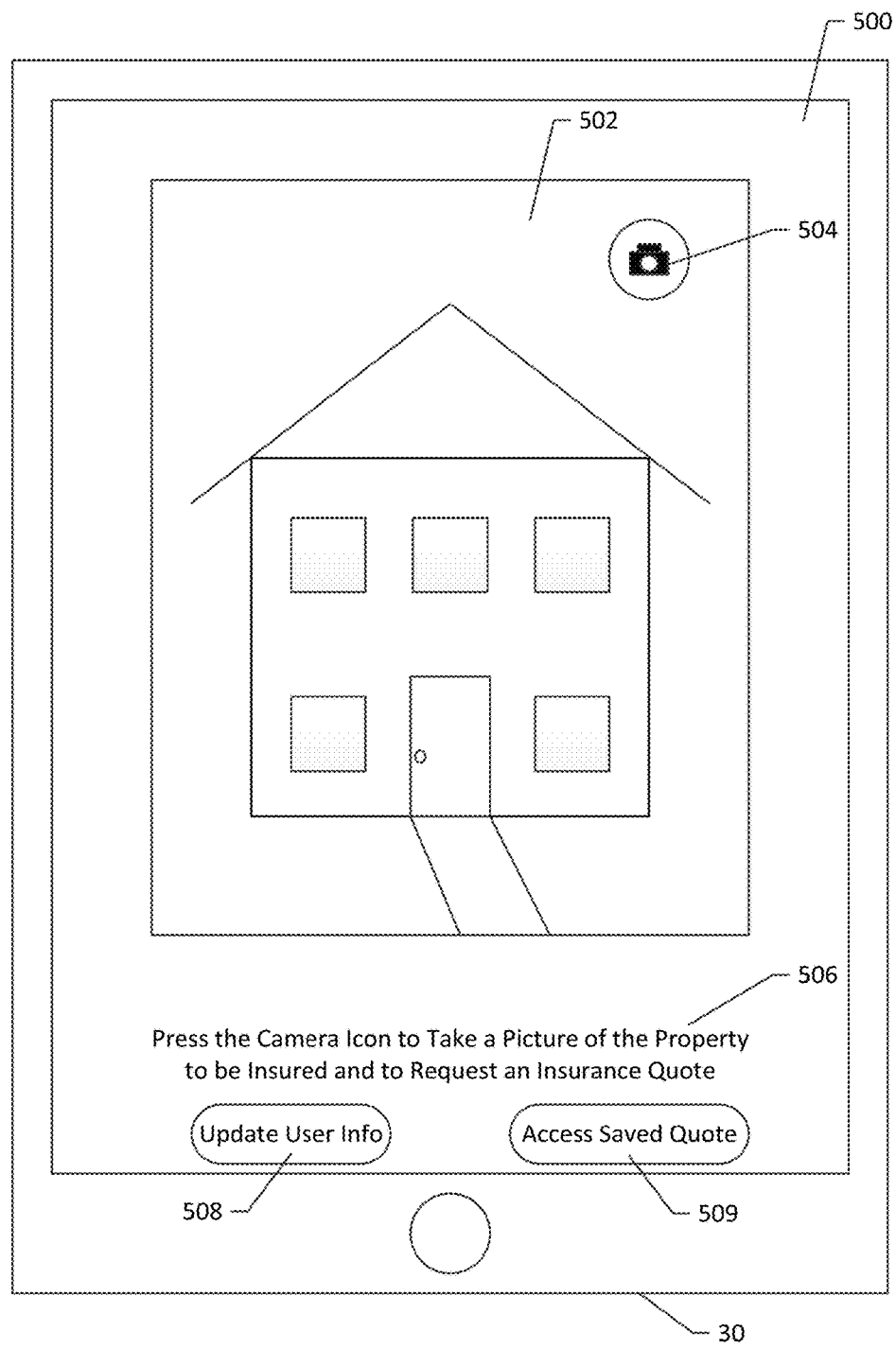
FIGS. 5-8 illustrate various views of an example interactive user interface, in accordance with an embodiment of the present invention.

FIG. 5 illustrates an example user interface 500 (e.g., mobile application, user application, browser, user interface, and/or the like) accessed via a user computing entity 30 for capturing image data associated with a property to be insured. The user interface 500 (e.g., mobile application, user application, browser, user interface, and/or the like) may provide a preview region 502 for previewing an image to be captured (or previously captured) and/or provide a variety of other functionality associated with the imaging device. The user interface 500 (e.g., mobile application, user application, browser, user interface, and/or the like) may also include an image data capture button/icon/input/graphic 504 such that user activation of the image data capture button/icon/input/graphic 504 causes the imaging device of the user computing entity 30 to capture image data. The user interface 500 (e.g., mobile application, user application, browser, user interface, and/or the like) may also include instructions 506 instructing the user to capture the image data. For example, the instructions 506 may instruct the user to capture a digital image of the property to be insured. The user interface 500 (e.g., mobile application, user application, browser, user interface, and/or the like) may also provide other options that a user may select. For example, the user interface 500 (e.g., mobile application, user application, browser, user interface, and/or the like) may include an update user info button/icon/input/graphic 508 for updating the user information/data received in step 404 or an access a saved quote button/icon/input/graphic 509 for accessing a quote that has already been provided and stored (possibly in the quote database 140). Once the user has selected the image data capture button/icon/input/graphic 504, or otherwise captured the image data associated with the property to be insured, the image data may be automatically provided to the quote system 100. In other embodiments, the user may be prompted to review a preview of the image data (e.g., a preview image) and to select a submit button/icon/input/graphic and/or the like to provide the image data to the quote system 100. Returning to FIG. 4, after capturing the image data, the user computing entity 30 may transmit the image data to the quote system 100 at step 406.

Remaining with FIG. 4, at step 408, the location of the property to be insured can be determined by the appropriate computing entity. For example, the location of the property to be insured may be determined in variety of ways including based at least in part on the image data and/or location information/data. In various embodiments, the image data may be embedded with location information/data. For example, as noted above, the user computing entity 30 may include location determining aspects and/or the like. Location information/data (e.g., longitude and latitude) determined by the location determining aspects at the time the image data is captured and/or the like may be embedded in the image data. This location information/data may be extracted from the image data by the user computing entity 30, the quote system 100, and/or various other computing entities. For example, an appropriate computing entity may extract a GPS location tag associated with the image data. In various embodiments, the location information/data (e.g., GPS location tag) may be used to determine (e.g., reverse geocode) a street address and/or other property identification (e.g., Lone Horse Ranch, 92 Hampshire Ct., and/or the like) associated with the property to be insured. In various embodiments, the street address and/or other property identification can be used to uniquely identify the property to be insured. As will be recognized, the location information/data need not be embedded in the image data, but can be captured and provided using a variety of other techniques and approaches. This allows the user computing entity 30 and/or the quote system 100 to analyze/process location information/data associated with the received image data to determine a location of the property to be insured. In various embodiments, the determination of the location of the property and corresponding quote generation and provision may be in response to, simultaneous with, or after receiving the image data. As previously described, in some embodiments, the user may be required input the property address via an appropriate interface.

In one embodiment, the quote system 100 and/or the user computing entity 30 may cause display of the property location, address, and/or identifying information/data to the user via the user interface (e.g., mobile application, user application, browser, user interface, and/or the like) and request that the user confirm the property location, address, and/or identifying information/data. For example, the user interface (e.g., mobile application, user application, browser, user interface, and/or the like) may prompt the user to confirm if the property to be insured is located at an identified address, in an identified neighborhood, associated with an identified area, in an identified county/municipality, and/or the like (all of which may be referred to as a surrounding area). If the address, property identifier, and/or other location information/data is incorrect as indicated by the user, the user (e.g., operating the user computing entity 30) may correct the location information/data and then submit the corrected location information/data. If the location information/data is correct, the user (e.g., operating the user computer entity 30) may simply confirm the presented location information/data (e.g., by selecting a confirm location button/icon/input/graphic and/or the like via the user interface executing on the user computing entity 30).

At step 410, with the location of the property to be insured identified, the quote system 100 can access information/data (both internal and external) associated with the property. For example, information/data associated with the property to be insured may be accessed using a variety of internal information/data sources or systems and/or a variety of external information/data sources or systems 200. Internal information/data may refer to information/data internal to the insurance provider. External information/data may refer to information/data external to the insurance provider. For example, the quote system 100 may access or communicate with one or more claims databases to identify, request, or determine whether prior losses have occurred at or are associated with the property to be insured. The one or more claims databases may be internal or external to the insurance provider. Similarly, the quote system 100 may access a variety of other sources and systems, including Zillow, Trulia, database(s) storing information related to previous claims and/or losses associated with the property, CLUE, MLS, government records, municipality/county records, and/or the like to identify information/data associated with property to be insured. For example, the quote system may access government records to identify, request, or determine internal or external historical information/data, such as the taxes, lot size, building square footage, ownership type, building age, number of bedrooms and/or bathrooms, number of units, zoning of property, property history (e.g., building permits for building, renovating, and/or expanding structures on the property, previous insurance claims, previous sales prices, changes of ownership, zoning changes affecting the property, previous police activity associated with the property, significant events associated with the property, and/or the like) and/or the like associated with the property to be insured. Similarly, the quote system 100 may access or communicate with external information/data source systems 200, such as the MLS or Zillow to identify, request, or determine information/data associated with the property to be insured and/or the surrounding area (e.g., geographic area, state, county, city, town, area code, zip code, school district, neighborhood, subdivision, street, street segment), including recent sale prices, foreclosures, or homes for sale in the surrounding area. The quote system 100 may also access or communicate with a variety of other internal and external sources and systems to identify, request, or determine crime information/data, school information/data, water damage information/data, flood zone information/data, earthquake damage information/data, replacement value, fire damage information/data, mud/land slide information/data, topological information/data, coverage A values for other properties in the surrounding area (e.g., state, county, city, town, area code, zip code, school district, neighborhood, subdivision), and/or the like. In various embodiments, the accessed information/data relating to the surrounding area (e.g., state, county, city, town, area code, zip code, school district, neighborhood, subdivision) may depend on the location of the property to be insured. For example, for a property located in California, earthquake and mud/landslide information/data may be accessed, but not for a property located in Kansas. In another example, flood zone information/data may be accessed for a property located in Florida, but not for a property located in New Mexico.

At step 412, the quote system 100 may analyze/process image information/data associated with the property to be insured to make various determinations and/or identify various features. Further, the quote system 100 may access additional image information/data associated with the property be insured. For example, the quote system 100 may request additional image information/data associated with the property to be insured from an external information/data source system 200, such as one or more address repositories comprising property image information/data like maps.google.com, bing.com/maps, mapquest.com, and/or the like. In one embodiment, the quote system 100 may request the additional image information/data associated with the property to be insured to receive satellite, street views, or 3-dimensional imaging of the property to be insured. The quote system 100 may then use image information/data (e.g., captured and/or received from an address repository) associated with the property to be insured and analyze/process the same for identifying specific property features. For example, the quote system may analyze/process the image information/data (e.g., captured and/or received from an address repository) to determine or identify buildings located on the property, such as homes, garages, sheds, commercial buildings, industrial buildings, and/or the like. The quote system 100 may also analyze/process the information/data (e.g., captured and/or received from an address repository) to determine or identify potential risks located on the property, such as pools, abandoned vehicles, holes, lakes, rivers, streams, ponds, railings along outside stairs and/or walkways, decks, porches, balconies, roof types (including age or condition), fences, trees with limbs hanging over buildings, fenced in yard, presence of a dog, presence of a trampoline, whether the property is occupied or not, and/or the like). As will be recognized, a variety of other property features or objects can be identified from the image information/data (e.g., captured and/or received from an address repository) by an appropriate computing entity.

Figure 6:
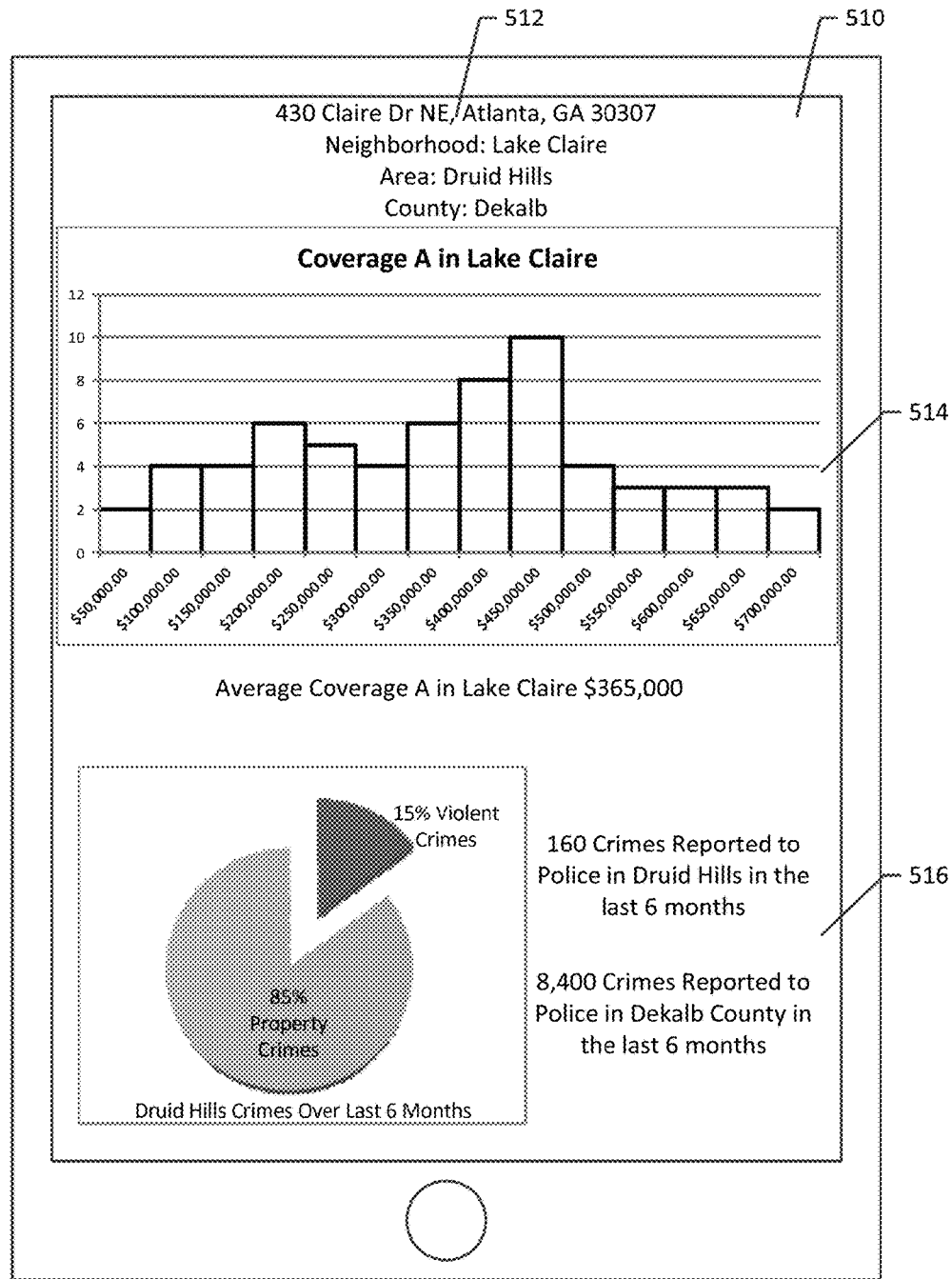

At step 414, the quote system 100 may generate an infographic (or other representation) comprising all or portions of the above-described information/data related to the property to be insured and/or the surrounding area (e.g., state, county, city, town, area code, zip code, school district, neighborhood, subdivision). For example, the quote system 100 may generate and provide the infographic (or other representation) such that the infographic (or other representation) may be displayed via the user computing entity 30. FIG. 6 illustrates an example screen shot of a user interface (e.g., mobile application, user application, browser, user interface, and/or the like) displaying an infographic (or other representation) view 510 comprising information/data related to the neighborhood and surrounding area associated with a property to be insured. The user computing entity 30 may cause display of the infographic (or other representation) view 510 to display above-described information/data related to the property to be insured and/or the surrounding area (e.g., state, county, city, town, area code, zip code, school district, neighborhood, subdivision). In one example, the infographic (or other representation) view 510 may include property location information/data 512. In the illustrated example, this may include the street address, neighborhood, area, and county associated with the property to be insured are listed. The infographic (or other representation) view 510 may also include a histogram and/or other information/data related to the coverage A 514 of other properties in the surrounding area. For example, in the illustrated infographic (or other representation) view 510, a histogram illustrates the coverage A of other properties in the neighborhood and the average coverage A values. The infographic (or other representation) view 510 may also include a graphical representation of crime information/data (e.g., statistics) in the surrounding area (e.g., state, county, city, town, area code, zip code, school district, neighborhood, subdivision) of the property to be insured. For example, a pie chart or other graphical representation may indicate prevalence and/or relative prevalence of various types of crime (e.g., violent crime vs. property crime and/or the like) in the neighborhood, area, and/or municipality/county over a given time period (e.g., the last decade, the last several years, the last six months, the last month, and/or the like). Other information/data may be provided via the infographic (or other representation) view 510. For example, information/data related to school information/data, water damage information/data, flood zone information/data, earthquake damage information/data, fire damage information/data, mud/land slide information/data, and/or the like associated with the surrounding area (e.g., state, county, city, town, area code, zip code, school district, neighborhood, subdivision) of the property to be insured may be provided via the infographic (or other representation) view 510.

Figure 7:
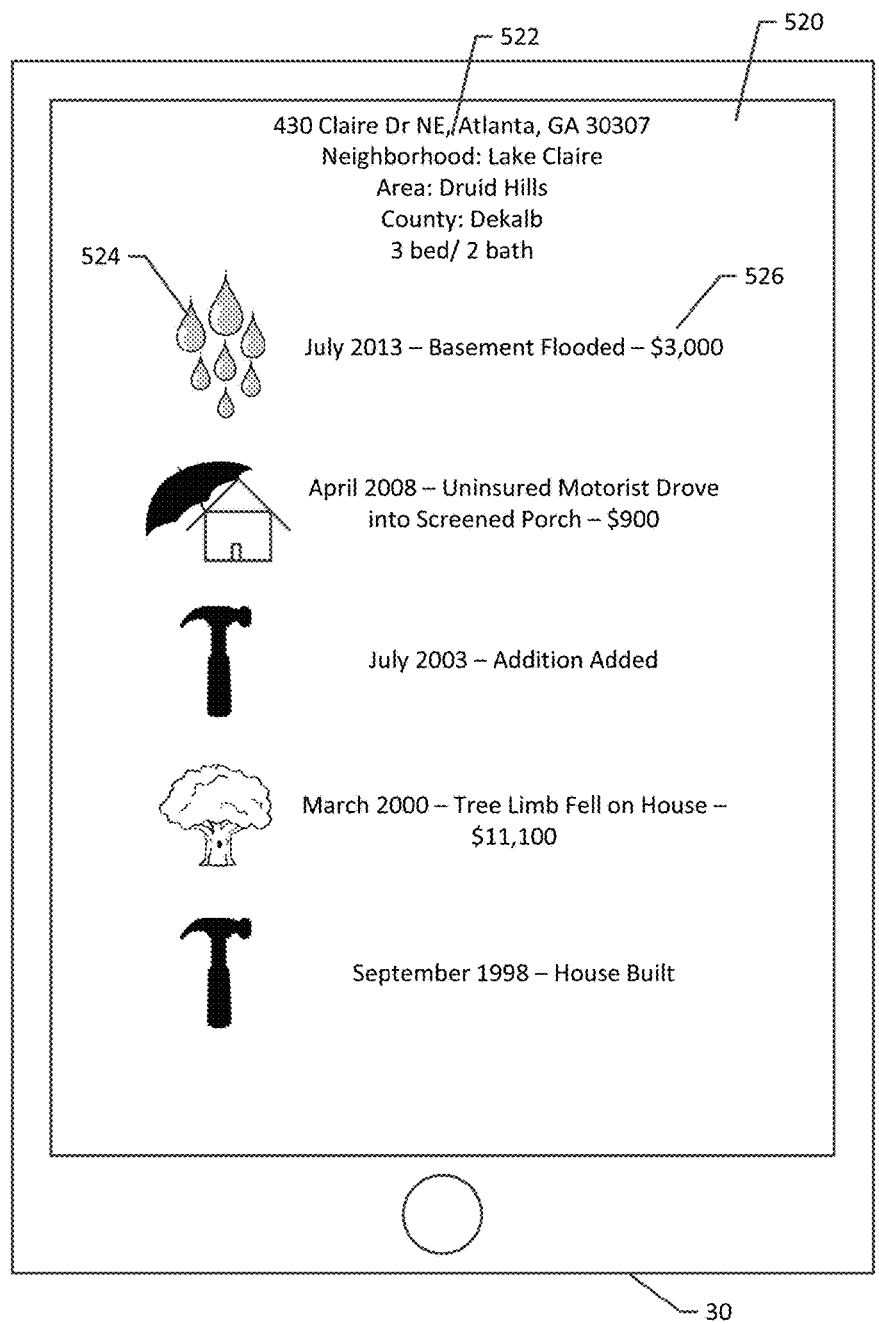

FIG. 7 illustrates a property history view 520 of the user interface (e.g., mobile application, user application, browser, user interface, and/or the like). In various embodiments, a property history view 520 may be displayed via the user computing entity 30 before, after, or simultaneous to an infographic (or other representation) view 510. The information/data displayed on the property history view 520 of the user interface (e.g., via the user computing entity 30) may include information/data related to previous claimed losses associated with the property to be insured as provided by the quote system 100. The property history view 520 may also include information/data associated with the property 522. For example, the information/data associated with the property may include the street address and/or other location information/data, and/or information/data related to the property (e.g., lot size, building square footage, number of bedrooms and/or bathrooms, number of units, zoning of property, and/or the like). The property history view 520 may include a listing of events 526 related to the history of the property. In various embodiments, the listing of events 526 may include information/data related to changes of ownership of the property; zoning changes affecting the property; the date a building on the property was built, renovated, expanded, and/or the like; dates of significant events associated with the property; dates of claimed losses associated with the property; dates of police activity associated with the property; and/or the like. In various embodiments, each item or group of items listed in the listing of events 526 may include a button/icon/input/graphic 524 or other graphical summary of the event. For example, each listing in the illustrated listing of events associated with the building, renovation, and/or expansion of a building on the property to be insured is accompanied by a hammer button/icon/input/graphic, indicating construction. The buttons/icons/inputs/graphics 524 and/or other graphical summaries may allow the user to quickly view the items listed on the property history view 520, to expand or minimize the same, and/or to conduct further research. In various embodiments, a listing of the property history view 520 may include information/data including a dollar amount associated with the loss/construction activity, a date, a brief description of the event, a detailed description of the event, links to images illustrating damage and/or construction associated with the event, and/or other information/data associated with the event. In some embodiments, a user may select an event from the event listing (e.g., by clicking on the listing via the user interface executing on the user computing entity 30) to be provided with additional information/data associated with the event.

In various embodiments, in addition to and/or in place of providing an infographic (or other representation) comprising information/data related to the neighborhood and surrounding area associated with a property to be insured and/or an infographic (or other representation) comprising property history information, the quote system 100 may provide driving directions to and/or from the property to be insured. For example, the quote system 100 or other appropriate computing device (e.g., the user computing entity 30) may determine the safest route to and/or from the property to be insured and a start and/or destination location and/or address provided by the user computing entity 30. In various such embodiments, the quote system 100 or other appropriate computing device may determine the safest route based on previous loss and/or previous claim information/data related to properties in the vicinity of the property to be insured and/or along one or more routes to and/or from the property to be insured. In one embodiment, the safest route may be determined on information/data from CLUE, proprietary previous claim and/or loss information/data, and/or other information/data related to the properties in the vicinity to be insured and/or along one or more routes to and/or from the property to be insured. The driving directions may be provided in a variety of forms. For example, the driving directions may be provided as a map, a list of turn by turn directions, audio directions, real-time turn by turn instructions, any combination thereof, and/or the like.

Returning to FIG. 4, at step 416, the quote system 100 may generate a quote for insurance coverage for the property to be insured. In various embodiments, the quote may be for a recommended and/or requested amount of insurance coverage for the property to be insured. In various embodiments, at least some of the received information/data (as described above) and/or information/data determined by analyzing/processing image information/data associated with the property to be insured may be used to generate the quote. In various embodiments in which user information/data, contact information/data, and/or identifying information/data is received, at least some of the user information/data, contact information/data, and/or identifying information/data may be used to generate the quote. In various embodiments, the quote may be provided without being underwritten in order to provide the user (e.g., property owner, prospective property owner, user, REALTOR®, agent, and/or insurance provider representative) with an instant quote or provisional quote. In such embodiments, a neutral credit score may be assumed rather than generating, requesting, or otherwise accessing an insurance score or credit information associated with the user. In various embodiments, a bindable quote (e.g., an underwritten quote) may be provided. The bindable quote may be provided in real-time or near real-time in various embodiments.

In embodiments in which a bindable quote is provided, an insurance score associated with the user may be generated, requested, and/or accessed. For example, at least some of the received user information/data, contact information/data, and/or identifying information/data may be used to generate an insurance score for the user. In various embodiments, the received user information/data, contact information/data, and/or identifying information/data may comprise various information/data associated with the property owner. In some such embodiments, the contact information/data and/or identifying information/data associated with the user may be used to access information/data (e.g., via the Internet) for generating an insurance score for the user (e.g., employment information/data, financial stability information/data, prior insurance information/data, marriage status, household income, personal property, credit history, payment history, and/or the like). In other embodiments, an insurance score associated with the user may be requested from a credit reporting agency (e.g., Equifax, Experian, TransUnion, Credit Karma, and/or the like) and/or another source. In various embodiments, the quote system 100 may access predetermined underwriting business rules to underwrite the generated quote. In such embodiments, the quote may be a bindable quote. As noted above, in some embodiments, the quote may be generated as a provisional quote based on the accessed or received information/data associated with the property to be insured. For example, in an embodiment in which the quote is not underwritten and/or an insurance score is not generated or received, the quote may be a provisional quote. For example, a neutral credit score may be assumed rather than calculating, requesting, or otherwise accessing credit information associated with the user. Thus, a provisional quote may be provided as an instant quote for insuring the property that may be further evaluated and/or underwritten later.

Figure 8:
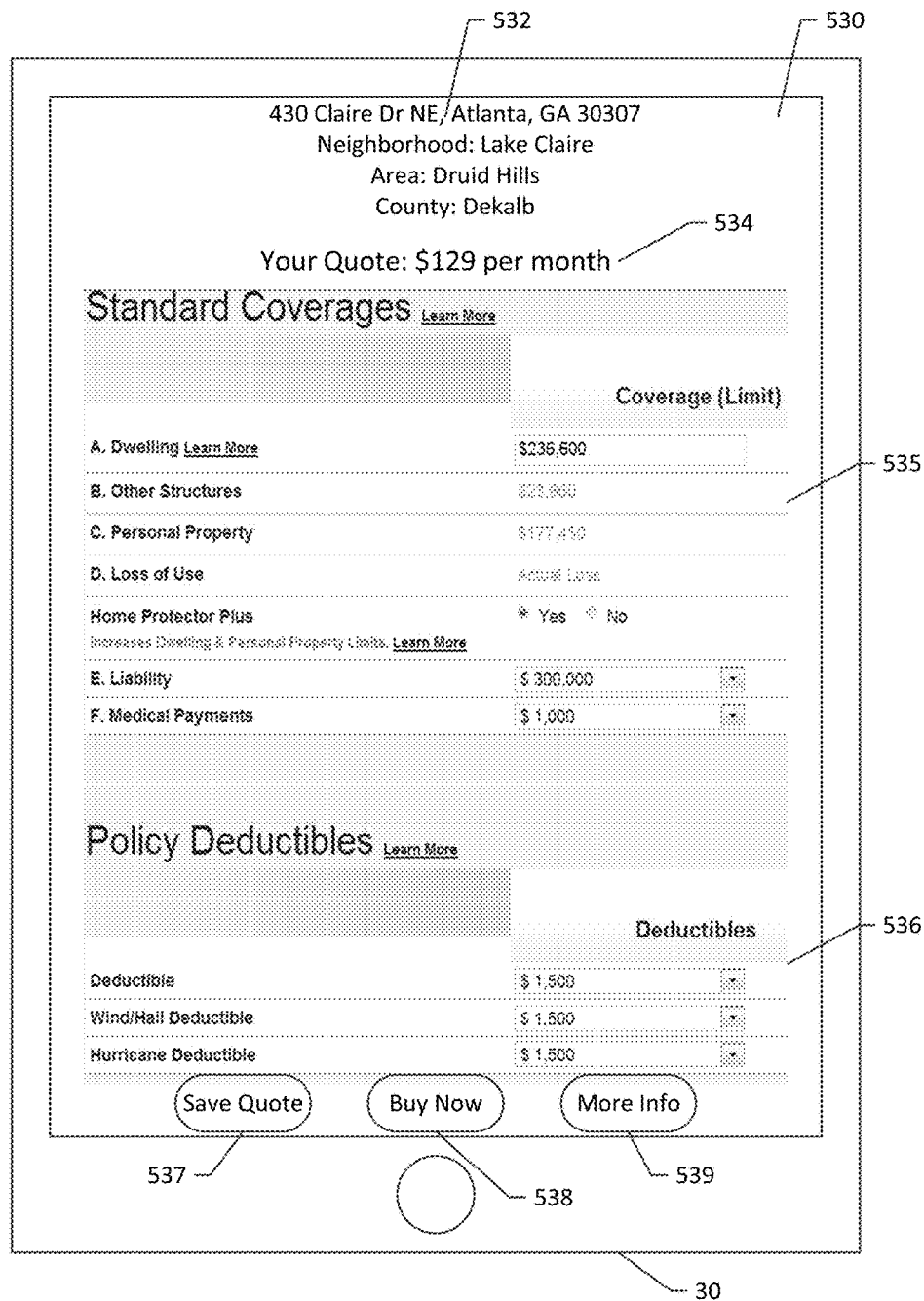

At step 418, the quote system 100 may provide the generated quote (e.g., via the user computing entity 30). FIG. 8 illustrates an example quote view 530 of the user interface (e.g., executing on the user computing entity 30) displaying a quote generated and provided by the quote system 100. The quote view 530 may include location information/data and/or other information/data 532 associated with the property to be insured. The quote view 530 may include a quote summary 534. For example, the quote summary 534 may summarize the cost per month and/or per year and/or the like for the quoted insurance coverage. The quote summary 534 may include other information/data summarizing the provided quote. The quote view 530 may also provide further information/data related to the provided quote. For example, the quote view 530 may include standard coverages 535 that may include information/data regarding the coverage A coverage, coverage B coverage, coverage C coverage, coverage D coverage, coverage E coverage, coverage F coverage, and/or the like associated with the provided quote. In various embodiments, the quote view 530 may include policy deductibles 536 associated with the generated and provided quote. For example, the quote view 530 may include policy deductibles 536 that may include information/data regarding a general deductible, a wind/hail deductible, a hurricane deductible, and/or the like associated with the coverage associated with the generated and provided quote.

In some embodiments, the standard coverages 535 portion and/or the policy deductibles 536 portion of the quote view 530 may include drop down menus and/or other mechanisms for a user to select and/or otherwise enter an updated value for a particular coverage and/or deductible. In some such embodiments, after receiving input indicating user selection or change of a particular coverage and/or deductible, or perhaps in response thereto, the quote system 100 may automatically generate and provide an updated quote. In other embodiments, an update quote button/icon/input/graphic (not shown) or the like may be provided so that a user (e.g., operating a user computing entity 30) may request an updated quote be generated and provided based on the received updates and/or changes to the various coverages and/or deductibles. After receiving a request or an updated quote, the quote system 100 may generate and provide an updated quote based at least in part on the received updates and/or changes. In various embodiments, the user may not be able to select or otherwise provide input (e.g., via the user computing entity 30) to change and/or update the standard coverages 535 and/or policy deductibles 536 associated with the generated and provided quote.

In various embodiments, the user (e.g., operating a user computing entity 30) may elect to receive more information/data regarding the insurance policy associated with the provided quote by selecting the more info button/icon/input/graphic 539. After input indicating the user selection (e.g., via a user computing entity 30) of the more info button/icon/input/graphic 539 is received, or perhaps in response thereto, the quote system 100 may provide more information/data regarding the policy terms and conditions associated with the insurance policy associated with the provided quote and/or more information/data regarding one or more particular coverages and/or deductibles.

In various embodiments, the user (e.g., operating a user computing entity 30) may elect (a) to save a quote by selecting the save quote button/icon/input/graphic 537 or (b) to initiate the buying of the insurance policy associated with the provided quote by selecting the buy now button/icon/input/graphic 538. After receiving input indicating user selection (e.g., via the user computing entity 30) of the save quote button/icon/input/graphic 537, or perhaps in response thereto, the quote system 100 may store the quote (e.g., in the quote database 140) in association with the user information/data. After receiving input indicating user selection (e.g., via the user computing entity 30) of the buy now button/icon/input/graphic 538, or perhaps in response thereto, the quote system 100 may provide the user (e.g., via the user computing entity 30) with a user interface (e.g., mobile application, user application, browser, user interface, and/or the like) to guide the user through the process of purchasing the insurance policy associated with the provided quote. In another embodiment, after receiving input indicating user selection (e.g., via the user computing entity 30) of the buy now button/icon/input/graphic 538, or perhaps in response thereto, the quote system 100 may provide the appropriate information/data to an insurance agent and/or sales representative to contact the user (e.g., via phone, email, text message, instant messenger, and/or the like) to facilitate the user purchasing the insurance policy associated with the provided quote, and/or the like.

In various embodiments, various credits, discounts, and/or similar words used herein interchangeably may be available based, at least in part, on aspects associated with the property to be insured. For example, if the property to be insured has an alarm system installed and/or activated, if the main building on the property to be insured has a fire-deterrent sprinkler system installed, if the pool is covered and has a child-proof fence around it, and/or the like, the property may qualify for one or more credits and/or discounts. In various embodiments, a user may claim a credit, discount, and/or similar words used herein interchangeably by providing image information/data (e.g., capturing and uploading image data) illustrating the particular aspect associated with the property to be insured. For example, a user may provide image information/data of the activated user interface (e.g., keypad) on the alarm system or of a covered pool with the fence around it. The image information/data may also include or be provided with location information/data as previously described. In various embodiments, the user (e.g., operating the user computing entity 30) may be provided with a user interface (e.g., mobile application, user application, browser, user interface, and/or the like) via which the user may upload image information/data associated with various aspects of the property to be insured. After receiving the image data, the quote system 100 may analyze/process the location information/data associated with the image information/data to determine if the location at which the image information/data was captured is the same as or at least substantially similar to the location of the property to be insured (as previously described). For example, the quote system 100 may analyze/process the location information/data associated with the image information/data to determine if the street address associated with the image information/data is the same as the street address for the property to be insured and/or for a property adjacent the property to be insured (e.g., the image information/data may have been captured while standing in the neighbor's yard and/or the like) or within a zone for confidence (e.g., ±0.000001, ±0.000001 from the property location). For example, the quote system 100 may analyze/process the location information/data associated with the received image information/data to determine if the image information/data was likely captured on the lot associated with the property to be insured, in the same neighborhood as the property to be insured, and/or the like. After determining that the location information/data associated with the received image information/data indicates that the image information/data is associated with the property to be insured, the image information/data may be analyzed/processed. For example, the image information/data may be analyzed/processed to determine whether there is a fence around the pool, there are handrails along the steps from the deck to the backyard, there are sprinklers installed in the main building on the property, and repairs for insurance compliance were completed. Similarly, the quote system 100 can analyze/process the image information/data to document renovations increasing the square footage, upgrades that would increase the value of the property, and/or the like. For example, the image data associated with a dog fence or dog training certification and/or the like may be provided to the quote system 100 in order to receive higher liability coverage. Image data showing that all major systems have been updated in order to alter the year built code, that all major systems have been updated to bring the systems up to current code, confirmation of the amperage of the electrical system, and/or a bill and/or subscription for security/connected home service, and/or the like may be provided to the quote system 100 in order to receive renovated home discounts. In various embodiments, the image information/data associated with the various aspects of the property to be insured may be used in place of a home inspection for insurance purposes.

In various embodiments, a credit and/or discount may be applied for before the quote is generated and provided, after a quote is generated and provided but before an insurance policy is purchased, and/or after the purchase of the insurance policy. If a credit and/or discount is applied for before the quote is generated and provided, the quote system 100 may request additional image information/data before generating and providing the quote (e.g., image information/data associated with the aspect of the property to be insured for which the user believes a credit and/or discount applies). The information/data determined by analyzing/processing the image information/data associated with the aspect of the property to be insured may then be used when the quote is generated (e.g., as part of the underwriting process, and/or the like). If a credit and/or discount is applied for between the provision of the quote and the purchase of the insurance policy, the quote system 100 may update the provided quote based at least in part on the information/data determined by analyzing/processing the image information/data associated with the aspect of the property to be insured. If a credit and/or discount is applied for after the insurance policy is purchased, the quote system 100 may update the insurance policy based at least in part on the information/data determined by analyzing/processing the image information/data associated with the aspect of the property to be insured. As will be recognized, a variety of other approaches and techniques can be used to adapt to various needs and circumstances.

IV. Exemplary Alternative Embodiment

Figure 9:
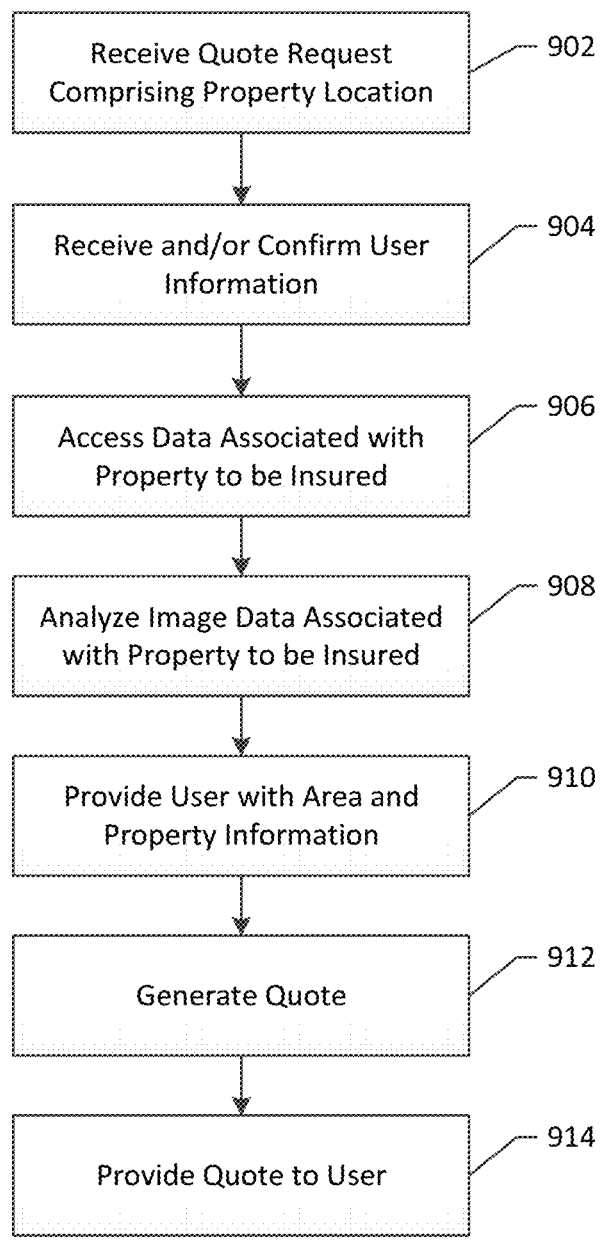
FIG. 9 is a flowchart illustrating operations and processes that can be used in accordance with various embodiments of the present invention.

In another example embodiment, a user (e.g., operating a user computing entity 30) may view information related to a property (e.g., a real estate listing and/or the like) on a third party website (e.g., Zillow, Trulia, MLS, realtor.com, and/or the like). Provided along with the information related to the property may be a button/icon/input/graphic and/or other mechanism for the user (e.g., operating the user computing entity 30) to indicate that he or she would like to receive an insurance quote for the property being viewed. FIG. 9 provides a flowchart of various procedures and operations that may be that may be performed in relation to generating and providing insurance quotes, in accordance with various such embodiments.

After the user (e.g., operating the user computing entity 30) clicks, selects, and/or otherwise provides input that he or she would like to receive an insurance quote for a particular property (e.g., the property for which a real estate listing is being viewed), or possibly in response thereto, the quote system 100 may receive the request for an insurance quote for the particular property, as step 902. The request may comprise the location and/or address of the particular property. At step 904, if the quote system 100 has already received user information/data (e.g., identifying information/data, contact information/data, other information/data, and/or the like as described above), the quote system 100 may request the user (e.g., via the user computing entity 30) to confirm the user information/data. If the quote system 100 has not already received user information/data, the quote system 100 may request user information/data (identifying information/data, contact information/data, other information/data, and/or the like) from the user (e.g., via a form or other input mechanism via the user computing entity 30 and/or the like). In some embodiments, the user may be asked to confirm the location and/or address of the particular property.

At step 906, the quote system 100 may access information/data associated with the particular property. For example, information/data associated with the particular property may be accessed using a variety of internal information/data sources or systems and/or a variety of external information/data sources or systems 200. As previously noted, internal information/data may refer to information/data internal to the insurance provider, and external information/data may refer to information/data external to the insurance provider. For example, the quote system 100 may access or communicate with one or more claims databases to identify, request, or determine whether prior losses have occurred at or are associated with the property to be insured. The one or more claims databases may be internal or external to the insurance provider. Similarly, the quote system 100 may access a variety of other sources and systems, including Zillow, Trulia, database(s) storing information related to previous claims and/or losses associated with the property, CLUE, MLS, government records, municipality/county records, and/or the like to identify information/data associated with the particular property. For example, the quote system may access government records to identify, request, or determine internal or external historical information/data, such as the taxes, lot size, building square footage, ownership type, building age, number of bedrooms and/or bathrooms, number of units, zoning of property, property history (e.g., building permits for building, renovating, and/or expanding structures on the property, previous insurance claims, previous sales prices, changes of ownership, zoning changes affecting the property, previous police activity associated with the property, significant events associated with the property, and/or the like) and/or the like associated with the particular property. Similarly, the quote system 100 may access or communicate with external information/data source systems 200, such as the MLS or Zillow to identify, request, or determine information/data associated with the particular property and/or the surrounding area (e.g., geographic area, state, county, city, town, area code, zip code, school district, neighborhood, subdivision, street, street segment), including recent sale prices, foreclosures, or homes for sale in the surrounding area. The quote system 100 may also access or communicate with a variety of other internal and external sources and systems to identify, request, or determine crime information/data, school information/data, water damage information/data, flood zone information/data, earthquake damage information/data, replacement value, fire damage information/data, mud/land slide information/data, topological information/data, coverage A values for other properties in the surrounding area (e.g., state, county, city, town, area code, zip code, school district, neighborhood, subdivision), and/or the like. In various embodiments, the accessed information/data relating to the surrounding area (e.g., state, county, city, town, area code, zip code, school district, neighborhood, subdivision) may depend on the location of the particular property. For example, for a property located in California, earthquake and mud/landslide information/data may be accessed, but not for a property located in Kansas. In another example, flood zone information/data may be accessed for a property located in Florida, but not for a property located in New Mexico.

In various embodiments, the accessed information/data may include image data. At step 908, the image data may be processed/analyzed. For example, the quote system 100 may request image information/data associated with the particular property from an external information/data source system 200, such as one or more address repositories comprising property image information/data (e.g., maps.google.com, bing.com/maps, mapquest.com, and/or the like), or from other information data source systems 200 storing real estate listings (e.g., Zillow, Trulia, realtor.com, MLS, and/or the like) and/or the like. In one embodiment, the quote system 100 may request the image information/data associated with the particular property to receive satellite, street views, or 3-dimensional imaging of the property being viewed. The quote system 100 may then use image information/data (e.g., captured and/or received from an address repository and/or the like) associated with the particular property and analyze/process the same for identifying specific property features. For example, the quote system may analyze/process the image information/data (e.g., captured and/or received from an address repository and/or the like) to determine or identify buildings located on the property, such as homes, garages, sheds, commercial buildings, industrial buildings, and/or the like. The quote system 100 may also analyze/process the image information/data (e.g., captured and/or received from an address repository) to determine or identify potential risks located on the property, such as pools, abandoned vehicles, holes, lakes, rivers, streams, ponds, railings along outside stairs and/or walkways, decks, porches, balconies, roof types (including age or condition), fences, trees with limbs hanging over buildings, fenced in yard, presence of a dog, presence of a trampoline, whether the property is occupied or not, and/or the like). As will be recognized, a variety of other property features or objects can be identified from the image information/data (e.g., captured and/or received from an address repository and/or the like) by an appropriate computing entity.

At step 910, the quote system 100 may provide the user with of providing an infographic (or other representation) comprising information/data related to the neighborhood and surrounding area associated with the particular property, an infographic (or other representation) comprising property history information associated with the particular property, and/or driving direction to and/or from the particular property. For example, the quote system 100 may provide an infographic to be displayed by the user computing entity 30 providing a representation of information/data associated with the neighborhood and surround area associated with the particular property, as discussed above with respect to and illustrated in FIG. 6. In another example, the quote system 100 may provide an infographic to be displayed by the user computing entity 30 providing a representation of property history information/data associated with the particular property, as discussed above with respect to and illustrated in FIG. 7. In yet another embodiment, the quote system 100 may provide driving directions to the user (e.g., via the user computing entity 30) for the safest route to and/or from the particular property, as discussed above. In various embodiments one or more infographics (or other representations) comprising information/data associated with the particular property, the neighborhood and/or surrounding area associated with the particular property, one or more routes to and/or from the particular property, and/or the like may be provided.

At step 912, an insurance quote for the particular property may be generated. As discussed above, the quote may be a quick/provisional quote that is not underwritten or a bindable quote that is underwritten. At step 914, the quote system 100 may provide the quote to the user (e.g., via the user computing entity 30, via a phone call, email, text message, and/or the like from an insurance agent or representative of the insurance provider, and/or the like). For example, a quote may be provided as described in relation to and illustrated in FIG. 8. In various embodiments, as described above, additional image data may be provided to the quote system 100 in order to pursue various credits, discounts, and/or similar words used herein interchangeably that may be available based, at least in part, on aspects associated with the particular property.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A mobile device comprising one or more memory storage areas storing application code comprising executable instructions, one or more processors, an imaging device, and a location determining device, the application code configured to, when executed by at least one of the one or more processors, cause the mobile device to:
cause the imaging device to generate preview image data, wherein the preview image data comprises at least one image of a property to be insured;
launch a user interface visible via a display of the mobile device, wherein the user interface (a) displays the preview image data and a selectable indicator corresponding to the preview image data, and b) receives user input selecting the selectable indicator corresponding to the preview image data;
in response to receiving the user input selecting the selectable indicator corresponding to the preview image data, (a) cause the imaging device to initiate capture of image data and (b) cause the location determining device to determine a current location of the mobile device;
embed location information encoding the current location of the mobile device in the image data;
provide a transmission comprising the image data;
receive a graphical presentation comprising of (a) historical data of the property to be insured, wherein the historical data comprises data related to one or more events associated with the property to be insured, and (b) surrounding area data for the property to be insured, wherein the surrounding area data comprises one or more statistics associated with the area surrounding the property to be insured;
render, by the user interface, at least a portion of the graphical presentation, the graphical presentation rendered in at least near real time with respect to the capturing of the image data; and
receive and render, by the user interface, quote information for an insurance policy corresponding to the property to be insured,
wherein:
the image data of the property to be insured is analyzed to extract information regarding at least one hazard located on the property to be insured,
the current location is extracted from the image data,
external information is accessed from one or more external information sources based on the extracted current location, the external information associated with the property to be insured and comprising at least one element selected from the group consisting of (a) historical data of the property to be insured and (b) surrounding area data of the property to be insured, the one or more external information sources being external to a server accessing the external information and the mobile device,
at least a portion of the external information is analyzed and, based on the analysis, the graphical presentation is generated and provided to the mobile device,
the quote information is generated based at least in part on (a) the extracted current location, (b) the accessed external information, and (c) the information regarding the at least one hazard extracted from the image data, and
the quote information is provided to and displayed by the user interface of the mobile device.

2. The mobile device of claim 1, wherein a location of the property to be insured is determined based at least in part on the current location extracted from the image data.

3. The mobile device of claim 1, wherein the at least one hazard is selected from the group consisting of a pool, abandoned vehicle, hole, lake, river, stream, pond, railing along outside stairs or walkways, deck, porches, balconies, roof type, roof condition, fences, trees, presence of a dog, presence of a trampoline, and whether property is occupied or not.

4. The mobile device of claim 1, wherein the external information comprises additional image data associated with the property to be insured and one or more hazards associated with the property to be insured are identified based at least in part on the additional image data.

5. The mobile device of claim 4, wherein:
location data associated with the additional image data is compared to the current location extracted from the image data to determine that the location data is consistent with the current location;
the additional image data is analyzed to identify at least one physical safety feature of the property to be insured, the at least one physical safety feature configured to mitigate a hazard associated with the property to be insured; and
one or more discounts are determined to be applicable to the property to be insured based at least in part on the identified at least one physical safety feature.

6. The mobile device of claim 1 wherein the external information associated with the property to be insured is selected from the group consisting of a comparison of coverage A in the surrounding area, crime statistics for the surrounding area, wind losses in the surrounding area, water losses in surrounding area, earthquake damage in the surrounding area, mud damage in the surrounding area, and flood zones in the surrounding area.

7. The mobile device of claim 1 wherein the quote information comprises at least one of a provisional quote or a bindable quote.

8. The mobile device of claim 1, wherein the quote information is generated based at least in part on an insurance score.

9. A method for providing a quote for an insurance policy, comprising: causing an application operating on a mobile device to:
cause the imaging device to generate preview image data, wherein the preview image data comprises at least one image of a property to be insured;
launch a user interface visible via a display of the mobile device, wherein the user interface (a) displays the preview image data and a selectable indicator corresponding to the preview image data, and (b) receives user input selecting the selectable indicator corresponding to the preview image data,
in response to receiving the user input selecting the selectable indicator corresponding to the preview image data, (a) cause the imaging device to initiate capture of image data and (b) cause the location determining device to determine a current location of the mobile device; embed location information encoding the current location of the mobile device in the image data; provide a transmission comprising the image data;
receive, a graphical presentation comprising (a) historical data of the property to be insured, wherein the historical data comprises data related to one or more events associated with the property to be insured, and (b) surrounding area data for the property to be insured, wherein the surrounding area data comprises one or more statistics associated with the area surrounding the property to be insured;
render, by the user interface, at least a portion of the graphical presentation, the graphical presentation rendered in at least near real time with respect to the capturing of the image data;
receive and render, by the user interface, quote information for an insurance policy corresponding to the property to be insured,
wherein:
the image data of the property to be insured is analyzed to extract information regarding at least one hazard located on the property to be insured, the current location is extracted from the image data,
external information is accessed from one or more external information sources based on the extracted current location, the external information associated with the property to be insured and comprising (a) historical data of the property to be insured and (b) surrounding area data of the property to be insured, the one or more external information sources being external to a server accessing the external information and the mobile device,
at least a portion of the external information is analyzed and, based on the analysis, the graphical presentation is generated and provided to the mobile device,
the quote information is generated based at least in part on (a) the extracted current location, (b) the accessed external information, and (c) the information regarding the at least one hazard extracted from the image data, and
the quote information is provided to and displayed by the user interface of the mobile device.

10. The method of claim 9 wherein a location of the property to be insured is determined based at least in part on the current location extracted from the image data.

11. The method of claim 9, wherein the at least one hazard is selected from the group consisting of a pool, abandoned vehicle, hole, lake, river, stream, pond, railing along outside stairs or walkways, deck, porches, balconies, roof type, roof condition, fences, trees, presence of a dog, presence of a trampoline, and whether property is occupied or not.

12. The method of claim 9, wherein the external information comprises additional image data associated with the property to be insured and one or more hazards associated with the property to be insured are identified based at least in part on the additional image data.

13. The method of claim 12, wherein:
location data associated with the additional image data is compared to the current location extracted from the image data to determine that the location data is consistent with the current location;
the additional image data is analyzed to identify at least one physical safety feature of the property to be insured, the at least one physical safety feature configured to mitigate a hazard associated with the property to be insured; and
one or more discounts are determined to be applicable to the property to be insured based at least in part on the identified at least one physical safety feature.

14. The method of claim 9 wherein the external information associated with the property to be insured is selected from the group consisting of a comparison of coverage A in the surrounding area, crime statistics for the surrounding area, wind losses in the surrounding area, water losses in surrounding area, earthquake damage in the surrounding area, mud damage in the surrounding area, and flood zones in the surrounding area.

15. The method of claim 9 wherein the quote information comprises at least one of a provisional quote or a bindable quote.

16. The method of claim 9, wherein the quote information is generated based at least in part on an insurance score.

17. A computer program product for providing an insurance quote, the computer program product comprising at least one non-transitory computer-readable storage medium having computer-readable program code portions stored therein, the computer-readable program code portions comprising program code instructions configured, when executed by at least one processor of a mobile device, to:
cause an imaging device of the mobile device to generate preview image data, wherein the preview image data comprises at east one image of a property to be insured;
launch a user interface visible via a display of the mobile device, wherein the user interface (a) displays the pre view image data and a selectable indicator corresponding to the preview image data, and b) receives user input selecting the selectable indicator corresponding to the preview image data,
in response to receiving the user input selecting the selectable indicator corresponding to the preview image data, (a) cause the imaging device to initiate capture of image data and (b) cause the location determining device to determine a current location of the mobile device; embed location information encoding the current location of the mobile device in the image data; provide a transmission comprising the image data;
receive, a graphical presentation comprising (a) historical data of the property to be insured, wherein the historical data comprises data related to one or more events associated with the property to be insured, and (b) surrounding area data for the property to be insured, wherein the surrounding area data comprises one or more statistics associated with the area surrounding the property to be insured;
render, by the user interface, at least a portion of the graphical presentation, the graphical presentation rendered in at least near real time with respect to the capturing of the image data;
receive and render, by the user interface, quote information for an insurance policy corresponding to the property to be insured,
wherein:
the image data of the property to be insured is analyzed to extract information regarding at least one hazard located on the property to be insured,
the current location is extracted from the image data,
external information is accessed from one or more external information sources based on the extracted current location, the external information associated with the property to be insured and comprising at least one element selected from the group consisting of (a) historical data of the property to be insured and (b) surrounding area data of the property to be insured, the one or more external information sources being external to a server accessing the external information and the mobile device,
at least a portion of the external information is analyzed and, based on the analysis, the graphical presentation is generated and provided to the mobile device;
the quote information is generated based at least in part on (a) the extracted current location, (h) the accessed external information, and (c) the information regarding the at least one hazard extracted from the image data, and
the quote information is provided to and displayed by the user interface of the mobile device.

18. The computer program product of claim 17, wherein the external information comprises additional image data associated with the property to be insured and one or more hazards associated with the property to be insured are identified based at least in part on the additional image data.

19. The computer program product of claim 18, wherein:
location data associated with the additional image data is compared to the current location extracted from the image data to determine that the location data is consistent with the current location;

the additional image data is analyzed to identify at least one physical safety feature of the property to be insured, the at least one physical safety feature configured to mitigate a hazard associated with the property to be insured; and one or more discounts are determined to be applicable to the property to be insured based at least in part on the identified at least one physical safety feature.

20. The computer program product of claim 17 wherein the external information associated with the property to be insured is selected from the group consisting of a comparison of coverage A in the surrounding area, crime statistics for the surrounding area, wind losses in the surrounding area, water losses in surrounding area, earthquake damage in the surrounding area, mud damage in the surrounding area, and flood zones in the surrounding area.

* * * * *

UNITED STATES PATENT AND TRADEMARK OFFICE
CERTIFICATE OF CORRECTION

PATENT NO. : 10,062,118 B1
APPLICATION NO. : 14/242959
DATED : August 28, 2018
INVENTOR(S) : Bernstein et al.

Page 1 of 1

It is certified that error appears in the above-identified patent and that said Letters Patent is hereby corrected as shown below:

In the Claims

Claim 1, Column 24, Line 67, delete "b)" and insert --(b)--

Claim 9, Column 26, Line 4, delete "," and insert --;--

Claim 17, Column 28, Line 3, delete "east" and insert --least--

Claim 17, Column 28, Line 5 and 6, delete "pre view" and insert --preview--

Claim 17, Column 28, Line 7, delete "b)" and insert --(b)--

Claim 17, Column 28, Line 9, delete "," and insert --;--

Claim 17, Column 28, Line 18, delete ","

Claim 17, Column 28, Line 52, delete "(h)" and insert --(b)--

Signed and Sealed this
Thirteenth Day of November, 2018

Andrei Iancu
*Director of the United States Patent and Trademark Office*